W. Donaldson,
Making Bungs,
№ 78,938. Patented June 16, 1868.
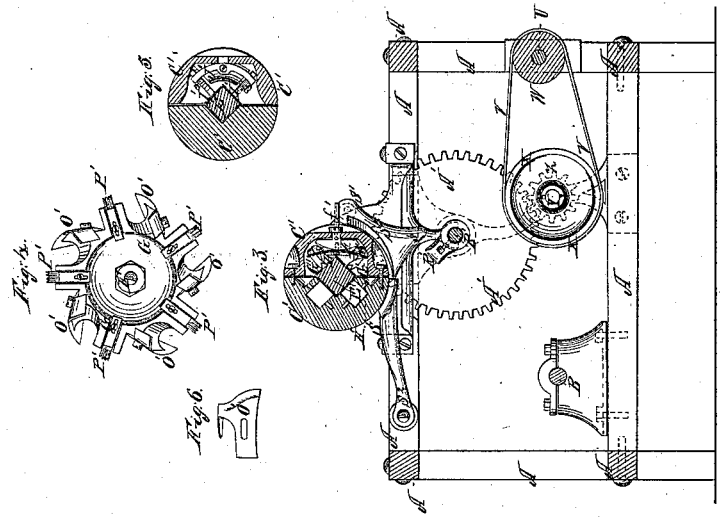
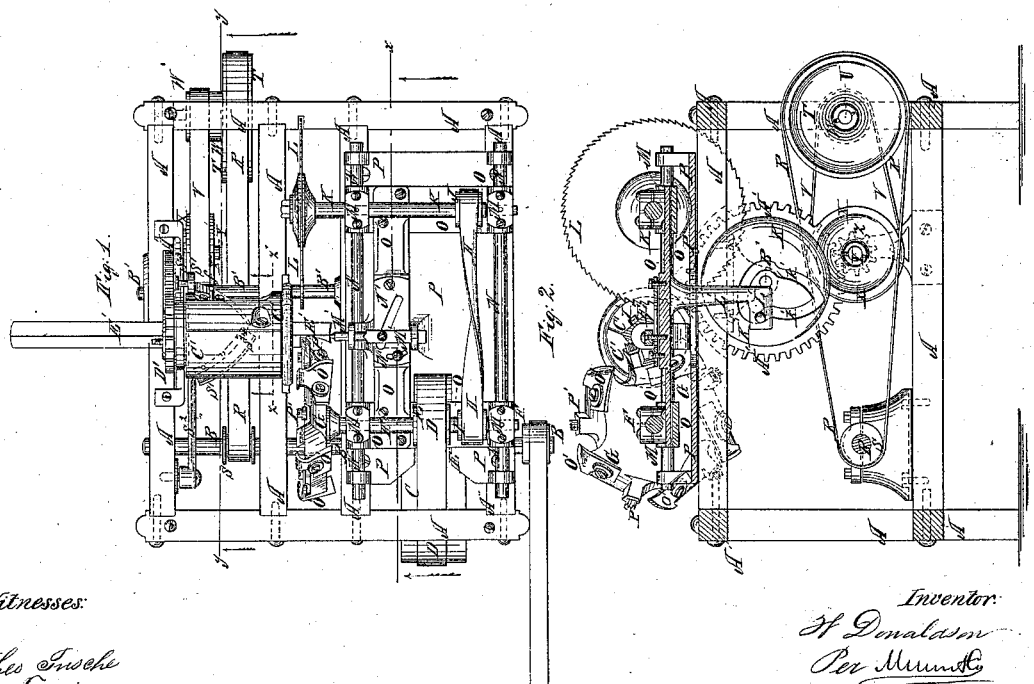
Witnesses:
Inventor:

United States Patent Office.

WILLIAM DONALDSON, OF CINCINNATI, OHIO.

Letters Patent No. 78,938, dated June 16, 1868; antedated January 3, 1868.

---

IMPROVEMENT IN MACHINES FOR MAKING BUNGS FOR CASKS.

---

The Schedule referred to in these Letters Patent and making part of the same.

---

TO ALL WHOM IT MAY CONCERN:

Be it known that I, WILLIAM DONALDSON, of Cincinnati, in the county of Hamilton, and State of Ohio, have invented a new and useful Improvement in Machine for Making Beer-Cask Bungs; and I do hereby declare that the following is a full, clear, and exact description thereof, which will enable others skilled in the art to make and use the same, reference being had to the accompanying drawings, forming part of this specification.

Figure 1, Plate I, is a top or plan view of my improved machine.
Figure 2, Plate I, is a detail sectional view of the same, taken through the line $x\ x$, fig. 1.
Figure 3, Plate II, is a detail sectional view of the same, taken through the line $y\ y$, fig. 1.
Figure 4, Plate II, is a detail side view of the cutter-head.
Figure 5, Plate II, is a detail sectional view, taken through the line $z\ z$, fig. 1.
Figure 6, Plate II, is a detail view of one of the angular cutters.
Similar letters of reference indicate corresponding parts.

My invention has for its object to furnish an improved machine, by means of which beer-cask bungs may be formed rapidly and accurately.

And it consists principally in the construction, combination, and arrangement of the parts by which the circular and lateral feed is effected, and of the parts by means of which the timber is held steady while being operated upon by the knives, and released while being cut off by the saw; the whole being constructed and arranged as hereinafter more fully described.

A is the frame of the machine. B is the driving-shaft, to which motion may be given from any convenient power in the ordinary manner. C is a large pulley, placed upon the shaft B. D is a band, passing around the pulley C and around the pulley E, placed upon the cutter-head shaft F, to impart motion to the cutter-head G.

H is a band, passing around the pulley I, attached to the cutter-head shaft F, and around the pulley J, attached to the saw-shaft K, to impart motion to the circular saw L.

The bearings M, of the shafts F and K, slide upon the stationary rods or shafts N, and are rigidly connected to each other by the bars or framework O, so as to be held always in the same relative positions with respect to each other.

The rods or shafts N are secured to supports or projections attached to or formed upon the bed-plate P, which is attached to the frame A of the machine.

R is a band, passing around the small pulley S, attached to the driving-shaft B, and around the large pulley T, working upon the spindle U, attached to the frame A of the machine. V is a band, passing around the small pulley W, rigidly connected to the pulley T, and working upon the spindle U, and around the large pulley X, working upon the spindle Y, attached to the frame A.

Z is a small gear-wheel, rigidly attached to the pulley X, and working upon the said spindle Y, into the teeth of which mesh the teeth of the large gear-wheel A', attached to the shaft B', which revolves in bearings attached to the frame A.

C' is a guiding-clutch, to hold the timber and feed it forward.

The clutch C' is made in the form of two half cylinders fitted together, and having a square hole formed longitudinally through its centre. The clutch C' revolves in bearings attached to the frame A, and has a gear-wheel, D', attached to its outer end, the teeth of which mesh into the teeth of the gear-wheel A'.

E' represents a square stick of timber, from which the bungs are formed, which passes through the square hole through the clutch C'.

F' is a block, which slides back and forth in a recess formed in the clutch C', and which has a pin, $f'$, formed upon or attached to it, which passes out through a longitudinal slot in the side of said clutch, as shown in fig. 3.

To the sides of the block E' are pivoted two claws or pawls, G', which are held down against the timber E' by the spring H' attached to the block F', and pressing against the claws G'.

I' are claws or pawls, pivoted in a recess in the forward part of the clutch C', and which are held down against the timber E' by a spring, J', to hold it while the claws G' are being drawn back.

To the forward end of the shaft B' is attached a circular disk or plate K', having an eccentric or cam-groove, $k'$, formed in its side, as shown in fig. 2, in which groove works a guide-pin, attached to the arm L', the upper end of which is attached to or forms a part of the framework O, so as to move the said framework, together with the cutters and saw, forward and back, as the said guide-pins move along the eccentric-groove $k'$.

M' is a centre, for supporting the end of the timber E' while revolving and while being operated upon by the cutters.

The centre M' slides in supports attached to the bed-plate P, and is moved back and forth to grasp and release the timber E', at the proper times, by a pin projecting from its under side, which enters an inclined slot formed in the plate N', which is adjustably attached to the framework O, as shown in figs. 1 and 2.

O' are the cutters, which are adjustably attached to the cutter-head G, and which are made in substantially the form shown in the drawings, the longer edge forming the convex tapering sides of the bung, and the shorter edge smoothing off the end of the timber which forms the head of the next bung. P' are serrated cutters, adjustably attached to the cutter-head G, between the cutters O', and are so placed as to enter the timber at the point where the angular part of said cutters O' will enter and form a cut or groove in advance of said cutters, to prevent the timber from being splintered or torn by the action of the angular part of said cutters O'.

R' is a cam, attached to the shaft B', which strikes against an arm, $s^1$, formed upon the under side of the inclined guide-plate S', which is pivoted to the frame A by means of the arm $s^2$, and which is made to move up and down in a vertical line by the guide-pin $s^3$, the head of which works in a groove formed in the edge of the bearing of the clutch C'.

The timber E' is fed forward by the guide-plate S' being raised at the proper time by the cam R', so that, as the clutch revolves, the pin $f'$ may strike against and be forced forward by the inclined edge of the said guide-plate S'.

The pin $f'$ is forced back, carrying the block F' and claws G' with it, by the pin $f'$ entering the inclined groove $s^4$, formed in or attached to the said guide-plate S'.

The timber E' is fed forward while the saw L is being moved back by the action of the eccentric-groove $k'$, after having cut off the completed bung, and before the action of the said eccentric-groove has brought the cutters O' into working position.

I claim as new, and desire to secure by Letters Patent—

1. The combination of the cam R', pivoted guide-plate S', pin $f'$, block F', claws G', spring H', pawls or claws I', spring J', and cylindrical clutch C' with each other, substantially as herein shown and described, and for the purpose set forth.

2. The combination of the centre M' and adjustable slotted plate N' with each other and with the cylindrical clutch C', as herein shown and described, for the purpose specified.

W. DONALDSON.

Witnesses:
 THOS. MCLEAN,
 VINCENT SCHURZ.